United States Patent
Kurzer et al.

(10) Patent No.: US 9,715,946 B2
(45) Date of Patent: Jul. 25, 2017

(54) BWR NUCLEAR FUEL ASSEMBLY WITH SNAP-IN SLEEVE SPRING

(75) Inventors: Klaus Kurzer, Igensdorf (DE); Erhard Friedrich, Eckental (DE); Dirk Blavius, Erlangen (DE); Bernd Block, Erlangen (DE)

(73) Assignee: AREVA NP, Courbevoie (FR)

( * ) Notice: Subject to any disclaimer, the term of this patent is extended or adjusted under 35 U.S.C. 154(b) by 364 days.

(21) Appl. No.: 13/808,130

(22) PCT Filed: Jul. 6, 2011

(86) PCT No.: PCT/EP2011/061410
§ 371 (c)(1),
(2), (4) Date: Mar. 1, 2013

(87) PCT Pub. No.: WO2012/004305
PCT Pub. Date: Jan. 12, 2012

(65) Prior Publication Data
US 2013/0163712 A1    Jun. 27, 2013

(30) Foreign Application Priority Data
Jul. 6, 2010  (EP) .................................... 10305752

(51) Int. Cl.
*G21C 3/32* (2006.01)
*G21C 3/33* (2006.01)
*G21C 5/06* (2006.01)

(52) U.S. Cl.
CPC ............. *G21C 3/3305* (2013.01); *G21C 3/33* (2013.01); *G21C 3/331* (2013.01); *G21C 5/06* (2013.01); *Y02E 30/40* (2013.01)

(58) Field of Classification Search
CPC . G21C 3/331; G21C 3/33; G21C 3/12; G21C 3/34; G21C 19/105; G21C 5/06; G21C 3/3305; G21C 3/32; Y02E 30/40
(Continued)

(56) References Cited
U.S. PATENT DOCUMENTS 3,158,543 A * 11/1964 Sherman .................. G21C 1/08
376/173
3,163,585 A * 12/1964 Metcalfe .................. G21C 1/32
165/172
(Continued)

FOREIGN PATENT DOCUMENTS

DE    20105913 U1    7/2001
JP    02-140689      5/1990
(Continued)

OTHER PUBLICATIONS

International Search Report for corresponding International application PCT/EP/2011/061410.

*Primary Examiner* — Marshall O'Connor
(74) *Attorney, Agent, or Firm* — Davidson, Davidson & Kappel, LLC (57) ABSTRACT

A nuclear fuel assembly is provided for a boiling water reactor. The nuclear fuel assembly includes a base, a head, and a bundle of full length fuel rods and partial length fuel rods, said bundle extending upwardly and longitudinally from the base to the head. The nuclear fuel assembly includes at least one clamp for longitudinally retaining a lower plug of a partial length fuel rod with respect to the base. The clamp is an additional part fitted to the base, the clamp is at least partially received in a housing provided in the base, and the clamp is assembled to the base by mechanical engagement of complementary assemblies.

18 Claims, 5 Drawing Sheets

(58) Field of Classification Search
USPC ....... 376/171, 172, 178, 362, 363, 364, 476,
376/446, 450, 441, 352–360, 399, 463
See application file for complete search history.

(56) References Cited

U.S. PATENT DOCUMENTS

| | | | | |
|---|---|---|---|---|
| 3,791,466 A * | 2/1974 | Patterson | ................ | G21C 3/32 376/441 |
| 3,968,008 A | 7/1976 | Piepers et al. | | |
| 4,152,206 A | 5/1979 | Jabsen | | |
| 4,664,879 A * | 5/1987 | Blaushild | ................ | G21C 7/08 138/42 |
| 4,822,558 A * | 4/1989 | Merkovsky | .......... | G21C 17/108 376/203 |
| 5,272,742 A * | 12/1993 | Attix | ................ | G21C 3/12 376/364 |
| 5,342,139 A * | 8/1994 | Hoffman | ................ | B60G 7/001 267/219 |
| 5,367,548 A * | 11/1994 | Attix | ................ | G21C 3/335 285/319 |
| 5,490,191 A * | 2/1996 | Christiansen | ............ | G21C 3/32 376/352 |
| D372,192 S * | 7/1996 | Pigott | ............................ | D8/499 |
| 5,730,657 A * | 3/1998 | Olgren | ................ | F16D 3/18 464/157 |
| 5,844,958 A * | 12/1998 | Leroux | ................ | G21C 3/334 376/353 |
| 6,115,440 A * | 9/2000 | Evans | ................ | G21C 3/334 376/364 |
| 6,199,837 B1 * | 3/2001 | Leonard | ................ | B60G 11/28 267/122 |
| 6,517,115 B1 * | 2/2003 | Blivet | ................ | F16L 37/084 285/18 |
| 2007/0211843 A1 * | 9/2007 | Smith, III | ............. | G21C 3/322 376/438 |
| 2008/0101528 A1 * | 5/2008 | Friedrich | ............. | G21C 3/3305 376/439 |

FOREIGN PATENT DOCUMENTS

| | | | | |
|---|---|---|---|---|
| JP | 2268289 A | 11/1990 | | |
| WO | WO92/20069 | * 11/1992 | ............... | G21C 3/33 |
| WO | WO 92/20069 A1 | 11/1992 | | |

* cited by examiner

BWR NUCLEAR FUEL ASSEMBLY WITH SNAP-IN SLEEVE SPRING

The present invention relates to a nuclear fuel assembly for a boiling water reactor comprising a base, a head, and a bundle of full length fuel rods and partial length fuel rods, said bundle extending upwardly and longitudinally from the base to the head, the nuclear fuel assembly comprising at least one clamp for longitudinally retaining a lower end of a partial length fuel rod with respect to the base.

BACKGROUND

In a nuclear fuel assembly for a boiling water reactor (BWR in the following specification), the full length fuel rods (FLFR in the following specification) are received between the base and the head of the fuel assembly with a small longitudinal gap allowing the FLFRs to expand in their longitudinal direction during operation of the nuclear reactor.

Usually, the upper ends of the FLFRs are retained by the head of the nuclear fuel assembly.

The partial length fuel rods (PLFR in the following specification) are used in BWRs for reasons of thermohydraulic stability and neutron moderation.

PLFRs extend upwardly from the base of the fuel assembly and stop at a distance from the fuel assembly's head. Usually, the length of the PLFRs is comprised between 25% and 75% of the length of the FLFRs.

The fuel rods are positioned and held longitudinally and transversally by a plurality of spacer grids spaced along the fuel rods. These spacer grids allow for local and limited sliding movement of the fuel rods in the spacer grids to accommodate the expansion of the fuel rods under irradiation.

Nevertheless, under specific operating conditions, the longitudinal holding force applied by the spacer grids to the bundle of fuel rods may not be sufficient to prevent a significant longitudinal displacement of PLFRs.

Accordingly, in order to prevent the PLFRs from lifting-off during nuclear reactor operation, PLFRs are usually attached to the base of the fuel assembly.

US-2008/0101528 discloses a fuel assembly. In this fuel assembly, the lower ends of the PLFRs are attached to the base through clamps which are integral with the base.

However, such an arrangement requires specific machining to achieve adequate tolerances for the clamps. Therefore, while such an arrangement is satisfactory, it is still desirable to simplify its design and lower its price.

SUMMARY OF THE INVENTION

An object of the invention is therefore to provide a fuel assembly which reduces the risk of lift-off of the PLFRs during operation of the nuclear reactor and which induces lower costs.

To this end, the invention relates to a fuel assembly as defined above, wherein the clamp is an additional part fitted to the base, the clamp is at least partially received in a housing provided in the base, and the clamp is assembled to the base by mechanical engagement of complementary assemblies.

According to specific embodiments, the fuel assembly may comprise one or several of the following features:
the complementary assemblies comprise first and second assemblies, the first assembly being adapted to retain the clamp against an upward displacement of the clamp with respect to the base and the second assembly being adapted to retain the clamp against a downward displacement with respect to the base,
the clamp is embedded in the housing,
the housing is a through-hole extending from an upper surface of the base to a lower surface of the base,
the clamp comprises support, adapted to contact a portion of the lower plug of the partial length fuel rod in order to hold the lower plug of the partial length fuel rod at a distance from the lower surface of the base,
the support comprise support tabs, spaced angularly about a longitudinal axis of the clamp, each support tab comprising a free end extending inwards in the direction of the longitudinal axis of the clamp, the free ends of the support tabs delimiting an opening for receiving said portion of the lower plug of the partial length fuel rod,
the second assembly comprise a lower support surface provided in the housing, the support tabs being supported longitudinally on the lower support surface (55),
the first assembly comprise an abutting surface provided in the housing, and elastic assembly tabs, provided on the clamp and comprising free ends extending upwards, the abutting surface being adapted to engage with the free ends of the elastic assembly tabs,
the clamp comprises elastic retaining tabs, spaced angularly about the longitudinal direction of the clamp and adapted to engage with a shoulder provided on the lower plug of the partial length fuel rod to prevent a disengagement of the partial length fuel rod from the base,
the clamp comprises a body and the support tabs extend inwards from a lower edge of the body, and the retaining tabs and assembly tabs extend upwards from an upper edge of the body,
the clamp only contacts the lower plug of the partial length fuel rods by the support tabs and of the retaining tabs, a radial clearance existing between an inner surface of the clamp and the peripheral surface of the lower plug of the partial length fuel rod in the portion of the partial length fuel rod extending between the support tabs and the retaining tabs,
the complementary assemblies comprise a central substantially flat base of the clamp, supported on a bottom of the housing and an abutting surface provided in the housing, the abutting surface being adapted to engage with upper free ends of the clamp,
the clamp comprises a constriction, which resiliently engages with the lower plug of the partial length fuel rod and is adapted to cooperate with a shoulder provided on the lower plug of the partial length fuel rod,
the base comprises an anti-debris filter, assembled to the base, the anti-debris filter comprising parallel bars, the housing being provided in a bar, the clamp comprises a central portion fitted around the bar and free ends, extending into the housing and forming a constriction in said housing, and the assemblies comprise complementary portions of the bar and the central portion of the clamp providing a form fit between the bar and the clamp and the constriction resiliently engages with the lower plug of the partial length fuel rod and is adapted to cooperate with a shoulder provided on the lower plug of the partial length fuel rod.

BRIEF DESCRIPTION OF THE DRAWINGS

The invention and its advantages will be better understood upon reading the following description, given solely by way of example and with reference to the appended drawings, in which.

DETAILED DESCRIPTION

Figure 1:
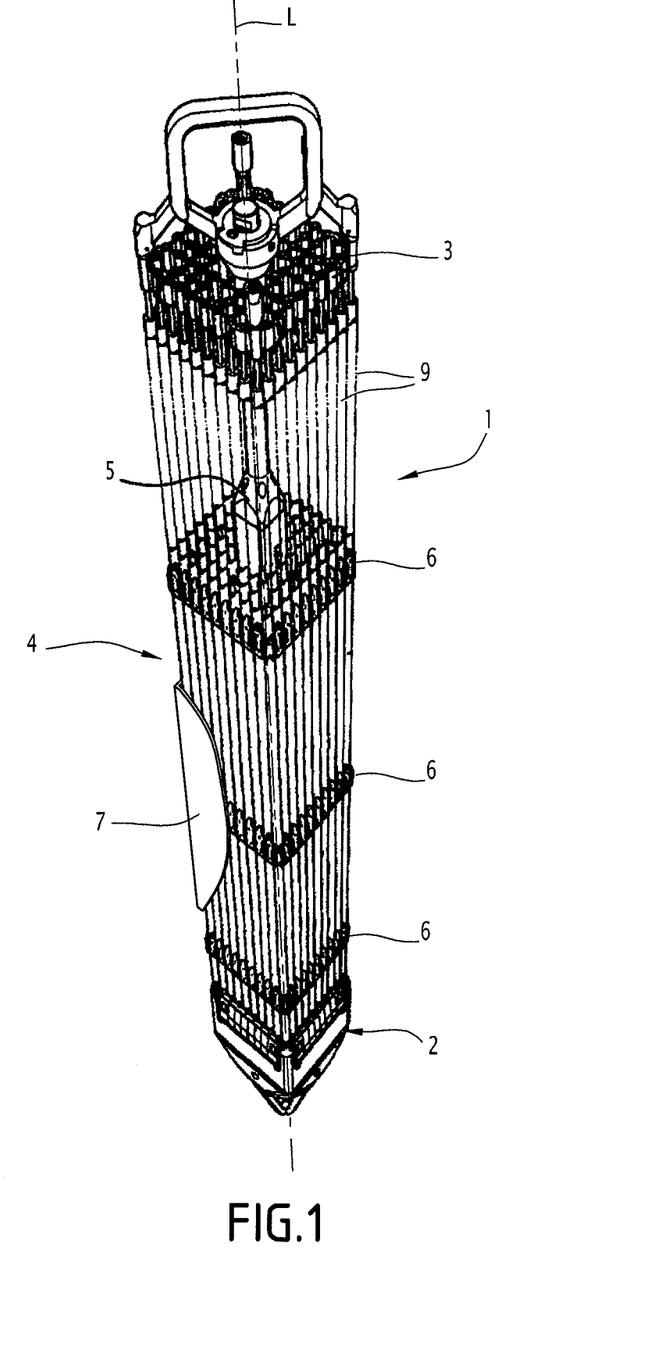
FIG. 1 is a schematic perspective view of a BWR nuclear fuel assembly according to the invention.

FIG. 1 shows a nuclear fuel assembly 1 for a boiling water reactor (BWR). This fuel assembly 1 extends along a vertical longitudinal direction L. Such a fuel assembly 1 is intended to be placed in a core of a nuclear reactor where coolant flows upwardly during operation of the nuclear reactor.

The fuel assembly 1 conventionally comprises:
a base 2 intended to rest on a lower plate of the core,
a head 3,
a bundle 4 of fuel rods, said bundle 4 extending longitudinally between the base 2 and the head 3,
a water channel 5 placed inside the bundle 4 and connecting the base 2 to the head 3,
a plurality of spacer grids 6 spaced apart along the longitudinal direction L and maintaining the bundle 4 longitudinally and transversally,
a fuel channel 7 surrounding the bundle 4 and the base 2 and fixed to the head 3.

Only a portion of the fuel channel 7 is shown on FIG. 1.

The bundle 4 comprises full length fuel rods (FLFRs) 9 and partial length fuel rods (PLFRs) 11 not shown on FIG. 1.

In the disclosed embodiment, the fuel assembly 1 comprises 20 PLFRs 11 and 92 FLFRs 9. However, these numbers may change from one embodiment to the other.

Each FLFR 9 and PLFR 11 comprises a cladding containing nuclear fuel pellets and closed by upper and lower plugs.

The FLFRs 9 are retained through their upper ends by the head 3 in a conventional way, e.g. by a grid with holes receiving pins provided on the upper plugs of the FLFRs 9.

The FLFRs 9 extend downwardly from the head 3 up to the base 2 while maintaining a longitudinal gap between the lower ends of the FLFRs 9 and the base 2 to allow longitudinal expansion of the FLFRs 9 during operation of the nuclear reactor.

The PLFRs 11 are shorter than the FLFRs 9. They extend upwardly from the base 2 and stop at a distance from the head 3. In some embodiments, the PLFRs 11 within the fuel assembly 1 may have different lengths.

Figure 2:
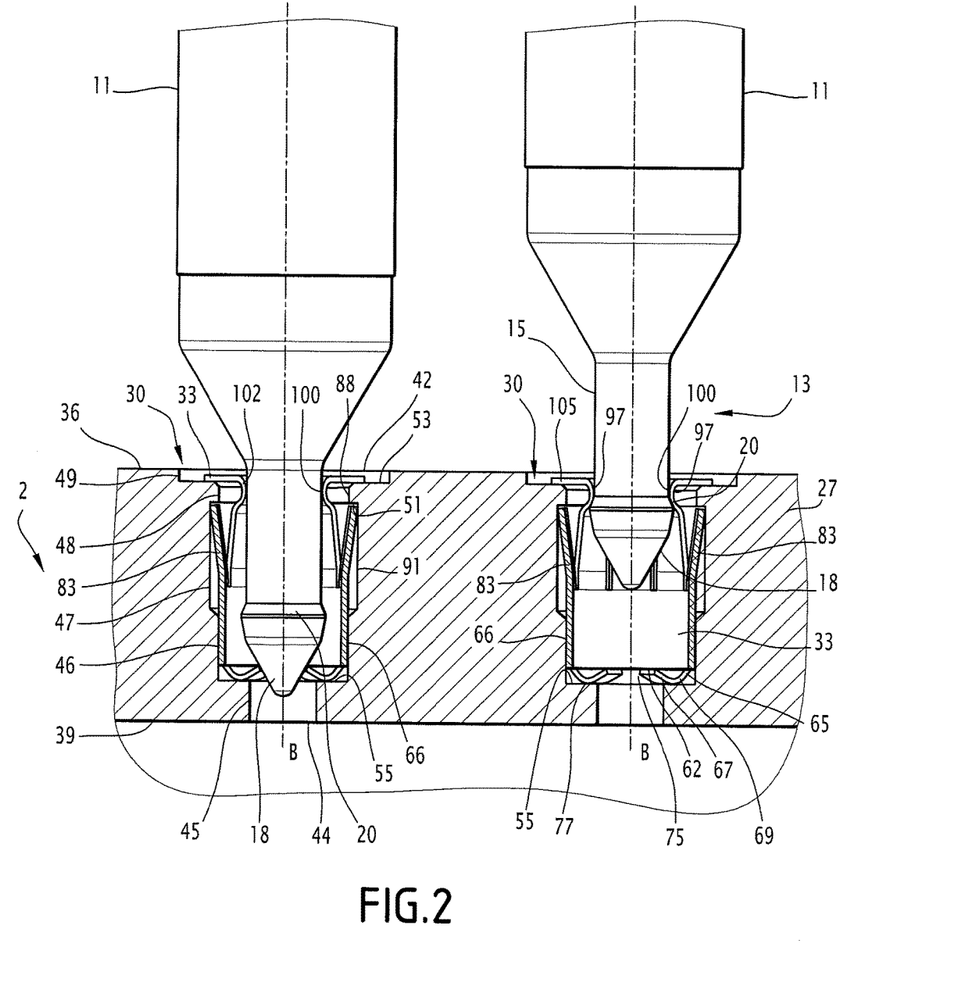
FIG. 2 is a partial cross-sectional view illustrating clamps for connecting PLFRs to a BWR nuclear fuel assembly base according to a first embodiment.

As shown on FIG. 2, the lower plug 13 of each PLFR 11 comprises a shank 15, extended downwardly by a converging portion 18. A shoulder 20 is provided on the lower plug 13 at the junction between the shank 15 and the converging portion 18. At the junction between the shank 15 and the converging portion 18, the diameter of the converging portion 18 is greater than the diameter of the shank 15. In the disclosed embodiment, the shank 15 is cylindrical and the converging portion 18 is substantially conical.

The base 2 includes a debris filter. This debris filter has, for example, a first set of parallel transversal bars and a second set of parallel transversal bars 27. The bars 27 of the second set of parallel bars extend e.g. perpendicular with respect to the bars of the first set of bars. On the figures, only one bar 27 of the debris filter is shown.

Housings 30, having a longitudinal axis B, are provided in the bars 27. Each housing 30 receives a clamp 33. Each clamp 33 is assembled to the base 2 by mechanical engagement of complementary assembly. The complementary assemblies comprise first assembly, adapted to retain the clamp 33 against an upward displacement with respect to the base 2 and second assembly, adapted to retain the clamp 33 against a downward displacement with respect to the base 2. The first and second assembly allow a functional axial clearance of the clamp 33 with respect to the base 2, to allow the installation of the clamp 33 in the base 2 during manufacturing.

Each clamp 33 receives the lower plug 13 of a respective PLFR 11 and is adapted for longitudinally retaining the respective PLFR 11 on the base 2, in order to prevent its disengagement from the base 2.

All the housings 30 and the respective clamps 33 they receive have generally similar shapes. Only one housing 30, the respective clamp 33 and their relationship with the respective PLFR 11 are disclosed hereinafter with respect to FIGS. 2 to 7.

Figure 3:
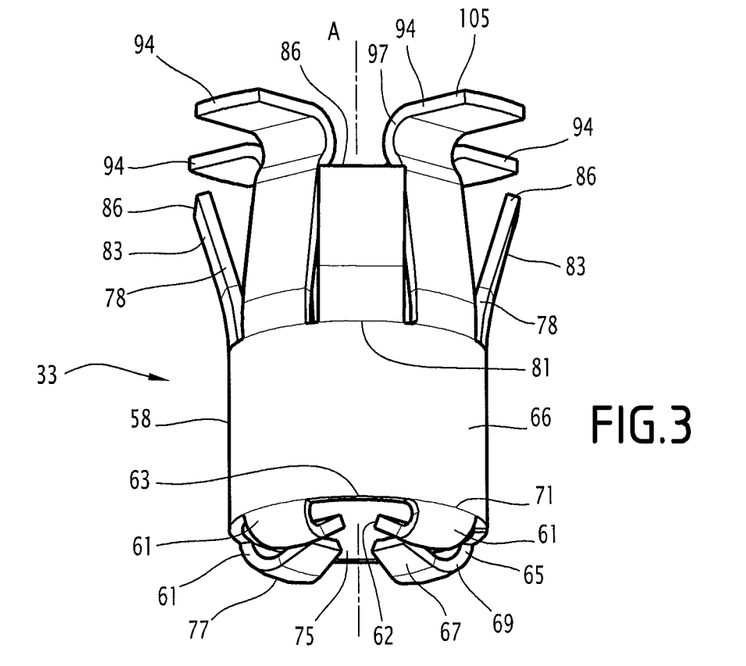
FIGS. 3 and 4 are schematic perspective views of the clamps of FIG. 2.
Figure 4:
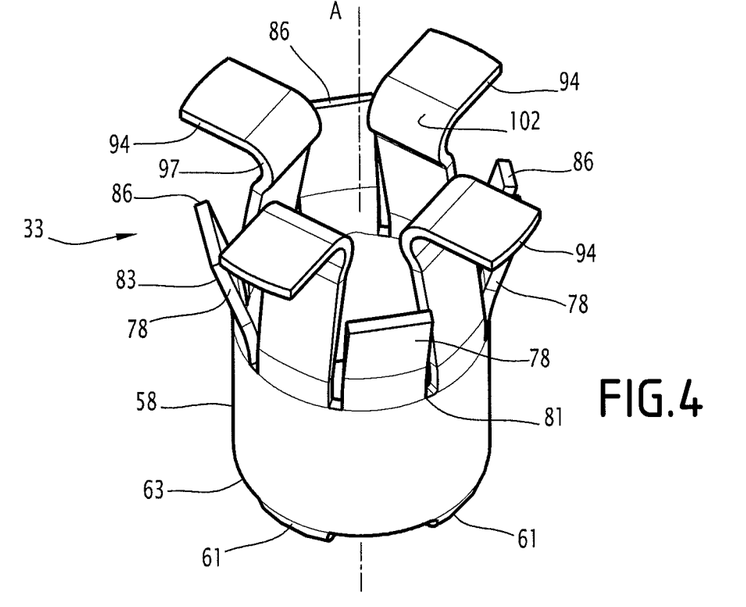

FIGS. 2 to 4 show a first embodiment, where the lower plug 13 of the PLFR 11 is free to move longitudinally between a seated position (left part of FIG. 2), in which it is longitudinally supported by supports provided on the clamp 33 and a pulled away position (right part of FIG. 2), in which it is longitudinally retained by retainers provided on the clamp 33.

In the seated position, the supports prevent the PLFR 11 from moving further downwards, for example under the effect of gravity.

In the pulled away position, the retainers prevent the PLFR 11 from moving further upwards, for example under the effect of the flow of coolant, and thus from becoming disengaged from the base 2.

In the nuclear fuel assembly 1, the PLFR 11 is free to move upwards from the seated position to the pulled away position or downwards from the pulled away position to the seated position. During normal operation of the nuclear reactor, the PLFR 11 is in the pulled away position, due to the flow of coolant through the nuclear fuel assembly 1.

While the seated and pulled away positions of the PLFR 11 are shown respectively on the left and right parts of FIG. 2 with respect to the first embodiment, the above mentioned features may apply to all other embodiments.

In the first embodiment, the clamp 33 is embedded in the housing 30. The housing 30 is a through-hole, extending from an upper surface 36 of the base 2, e.g. an upper surface 36 of the respective bar 27 to a lower surface 39 of the base 2, e.g. a lower surface of the bar 27. Upper and lower through-hole edges 42, 44 are formed respectively at the intersections of the housing 30 with the upper and lower surfaces 36, 39 of the base 2. The lower plug 13 of the PLFR 11 does not protrude below the lower surface 39 of the base 2.

In the first embodiment, the housing 30 is a stepped through-hole. It comprises, starting from the lower surface 39 of the base 2:
a first, a second and a third housing section 45, 46, 47, e.g. cylindrical sections of increasing diameter,
a fourth housing section 48, e.g. a cylindrical section having a diameter which is smaller than that of the third housing section 47, and a fifth housing section 49, e.g. a cylindrical section having a diameter that is greater than the diameter of the fourth housing section 48.

A top surface of the third housing section 47 forms an abutting surface 51. The abutting surface 51 extends in a plane that is perpendicular to the longitudinal axis B of the housing 30.

A bottom surface of the fifth housing section 49 forms an upper support surface 53.

A bottom surface of the second housing section 46 forms a lower support surface 55.

The upper and lower support surfaces 53, 55 are substantially perpendicular to the longitudinal axis B of the housing 30 and parallel to the abutting surface 51.

The clamp 33 according to the first embodiment is shown in more detail on FIGS. 3 and 4. It comprises a hollow body 58, e.g. of circular cross-section, having a longitudinal axis A. The body 58 is received in the second and third housing sections 46, 47 of the housing 30. The outer diameter of the body 58 is smaller than or equal to the diameter of the second housing section 46. The body 58 is rigid. The inner diameter of the body 58 is greater than the diameter of the shank 15 of the lower plug 13.

In this embodiment, the supports, adapted to prevent a downward displacement of the lower plug 13 of the PLFR 11 from its seated position, comprise support tabs 61. Each support tab 61 comprises a free end 62 which extends inwards from a lower edge 63 of the body 58 towards the longitudinal axis A of the body 58. The support tabs 61 are spaced angularly about the longitudinal axis A of the clamp 33.

The support tabs 61 have a bent shape and comprise first and second portions 65, 67, connected by means of a bend 69. The first portion 65 has an upper end 71 attached to the lower edge 63 of the body 58. The first portion 65 extends downwards with respect to the lower edge 63 and inwards with respect to an outer peripheral surface 66 of the body 58. The second portion 67 extends upward and inward with respect to the bend 69. The end of the second portion 67 is the free end 62.

In this embodiment, each support tab 61 is made one-piece. The support tabs 61 are rigid. In particular, they do not yield under the weight of the PLFR 11.

The free ends 62 jointly form a discontinuous circumference partially delimiting an opening 75, adapted to allow a tip of the converging portion 18 of the PLFR 11 to pass through said opening 75 and protrude below said free ends 62 in the seated position of the PLFR 11. The diameter of the opening 75 is intermediate between the smallest and the largest diameters of the converging portion 18. Thus, the free ends 62 contact the converging portion 18 of the respective PLFR 11 in the seated position. They are adapted to jointly longitudinally support the PLFR 11 in the seated position.

The diameter of the opening 75 is smaller than the diameter of the first housing section 45. The opening 75 formed by the free ends 62 is spaced longitudinally from the lower surface 39 of the base 2 in order to prevent the lower plug 13 from plugging the first housing section 45 of the housing 30.

The clamp 33 may e.g. comprise four support tabs 61, e.g. regularly spaced about the longitudinal axis A of the clamp 33.

As is shown on FIG. 2, a lower surface 77 of the bend 69 is supported on the lower support surface 55 provided in the housing 30. Thus, in the first embodiment, the second assembly comprises the lower surface 77 of the bend 69 and the lower support surface 55.

In the first embodiment, the clamp 33 further comprises elastic assembly tabs 78. The assembly tabs 78 are spaced angularly with respect to the longitudinal axis A of the clamp 33. They extend upwards from an upper edge 81 of the body 58 of the clamp 33. In a resting configuration, the assembly tabs 78 extend outwards with respect to the outer peripheral surface 66 of the body 58. They are elastically deformable under the effect of a force applied to their outer surface 83 at least towards a configuration in which they are flush with the outer peripheral surface 66 of the body 58.

All the assembly tabs 78 may be identical. The clamp 33 may e.g. comprise four assembly tabs 78, regularly spaced about the longitudinal axis A of the clamp 33.

The length of the assembly tabs 78 is such that the assembly tabs 78 are entirely comprised in the third housing section 47 and such that their respective free ends 86 are adapted to longitudinally abut against the abutting surface 51 when the clamp 33 is received in the housing 30.

Thus, the assembly tabs 78 and the abutting surface 51 form the first assembly, adapted to retain the clamp 33 against an upward displacement with respect to the base 2.

During the mounting of the nuclear fuel assembly 1, the clamp 33 is inserted into the housing 30 from the upper surface 36 of the base 2. During the insertion of the clamp 33 into the housing 30, the assembly tabs 78 are elastically deformed inwards by the force exerted by a peripheral wall 88 of the fourth housing section 48. As soon as the free ends 86 have passed the fourth housing section 48, the assembly tabs 78 deform elastically outwards towards their resting configuration, until they abut against a peripheral wall 91 of the third housing section 47. When the lower surfaces 77 of the support tabs 61 are supported on the lower support surface 55 provided in the housing 30, the free ends 86 of the assembly tabs 78 are located below the abutting surface 51, in order to retain the clamp 33 against an upward displacement.

The clamp 33 further comprises elastic retaining tabs 94, adapted to longitudinally retain the lower plug 13 of the respective PLFR 11, in order to prevent its disengagement from the bar 27 and thus from the base 2. The clamp 33 may e.g. comprise four elastic retaining tabs 94. The elastic retaining tabs 94 are spaced about the longitudinal axis A of the clamp 33. They extend upwards from the upper edge 81 of the body 58. In the illustrated embodiment, the retaining tabs 94 are identical. Each retaining tab 94 comprises a constriction 97. As shown on the right side of FIG. 2, the constrictions 97 of the retaining tabs 94 extend inwards, in the direction of the longitudinal axis A of the clamp 33, above the shoulder 20 provided on the lower plug 13 of the respective PLFR 11. The constrictions 97 jointly delimit an opening 100. When the PLFR 11 is in the pulled away position, the constrictions 97 are adapted to engage with the shoulder 20, in order to prevent an upward displacement of the PLFR 11 and thus a disengagement of the PLFR 11 from the base 2.

In a resting configuration, the diameter of the e.g. essentially circular discontinuous circumference of the opening 100 is smaller than the diameter of the converging portion 18 of the respective PLFR 11 at the junction between the converging portion 18 and the shank 15. From the resting configuration, the retaining tabs 94 are elastically deformable radially outwards, under the effect of a force applied to an inner surface 102 of the constrictions 97. In one embodiment, the diameter of the opening 100 in the resting configuration is smaller than the diameter of the shank 15. This feature increases the friction between the lower plug 13 and the retaining tabs 94, and therefore increases the clamping force of the clamp 33.

The elasticity of the retaining tabs 94 is adapted to allow an elastic radial deformation of the retaining tabs 94 away from their resting configuration when the PLFR 11 is intentionally inserted into or extracted out of the clamp 33, and so as to prevent an outward deformation of the retaining tabs 94 merely under the effect of an upward force exerted by the PLFR 11, more particularly by the shoulder 20, on the constrictions 97 during operation of the nuclear fuel assembly 1.

In the first embodiment, each retaining tab 94 further comprises, above the constriction 97, a substantially planar portion 105, which extends outwards. In the nuclear fuel assembly 1, the substantially planar portion 105 extends along a plane that is substantially parallel to the plane of the upper support surface 53 provided in the housing 30. The substantially planar portion 105 is adapted to facilitate the deformation of the retaining tabs 94 away from their resting configuration during insertion of the PLFR 11 into the clamp 33.

In the first embodiment, the assembly tabs 78 and the retaining tabs 94 alternate along the upper edge 81 of the body 58.

In this nuclear fuel assembly 1, the risk of lift-off of the PLFRs 11 during operation of the nuclear reactor is reduced, since the lower plugs 13 of the PLFRs 11 are longitudinally retained on the base 2 by the cooperation of the shoulder 20 provided on the lower plug 13 with the elastic retaining tabs 94.

The nuclear fuel assembly 1 induces lower costs, since the clamp 33 is simple to manufacture and can be assembled and secured to the base 2 in one operation, simply by mechanical engagement of complementary assemblies.

The fact that the housing 30 is a through-hole allows for coolant to flow through the base 2 and along the lower plugs 13 of the PLFRs 11. This flow of coolant is useful to cool the lower plugs 13 of the PLFRs 11 and to avoid CRUD (Chalk River Unidentified Deposits) occurring during normal plant operation and which may interfere with the proper function of the clamp 33 during pull out and insertion of PLFR 11.

Figure 5:
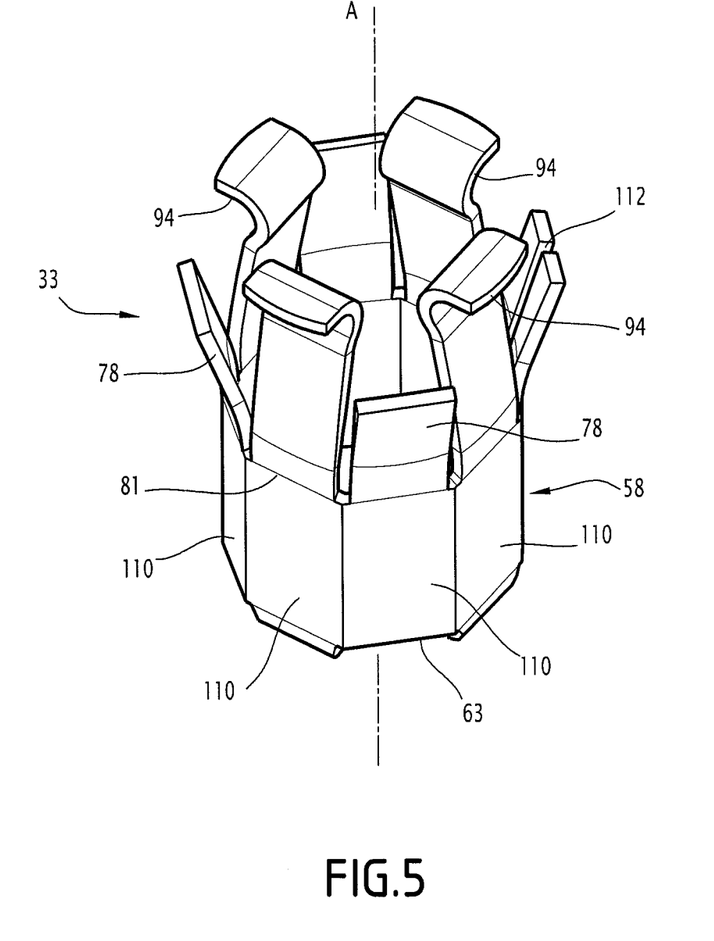
FIG. 5 is a schematic perspective view of a clamp according to a second embodiment.

FIG. 5 shows a clamp 33 according to a second embodiment. The second embodiment differs from the first embodiment by the cross-section of the body 58 and the shape of the retaining tabs 94.

In the second embodiment, the body 58 has a polygonal cross-section, and in particular an octagonal cross-section. The body 58 comprises e.g. eight rectangular faces 110, extending along the longitudinal direction A of the clamp 33 from the lower edge 63 to the upper edge 81 of the body 58. Each retaining tab 94 and each assembly tab 78 extends upwards from a portion of the upper edge 81 of the body 58 corresponding to one of the rectangular faces 110 of the body 58. In this embodiment, the diameter of the circle in which the octagonal cross-section of the body 58 is inscribed is smaller than or equal to the diameter of the second housing section 46.

Moreover, the retaining tabs 94 do not comprise the planar portion 105.

The nuclear fuel assembly 1 according to the second embodiment is simpler to manufacture than the nuclear fuel assembly 1 according to the first embodiment, since it does not comprise the planar portion 105.

In the first and the second embodiment, the clamp 33 may comprise a slit 112 (FIG. 5), adapted to facilitate the insertion of the clamp 33. The octagonal cross-section of the body 58 in the second embodiment can be used together with the slit 112 to expand the body 58 when the end plug 13 is inserted into the clamp 33 in order to further press the assembly tabs 78 against the peripheral walls of the housing 30.

Figure 6:
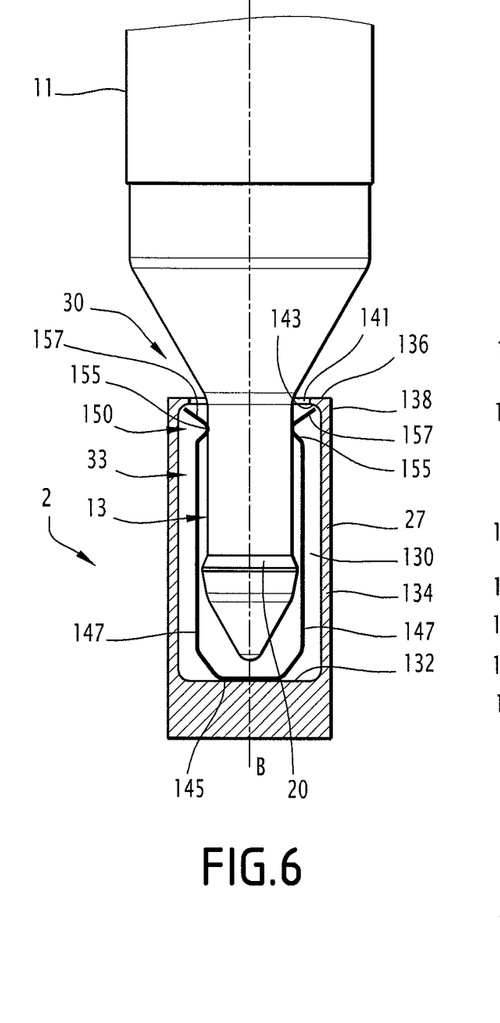
FIGS. 6 and 7 are schematic partial cross-sectional views illustrating the connection between PLFRs and a BWR nuclear fuel assembly base according to respectively a third and a fourth embodiment.

In the third embodiment shown on FIG. 6, each housing 30 comprises a recess 130 provided in the base 2, and more particularly in a respective bar 27. The recess 130 has a longitudinal axis B and opens upwardly in order to receive the respective PLFR 11. The housing 30 is delimited by a closed bottom 132, a peripheral wall 134 and a top 136. The peripheral wall 134 extends upwardly from the bottom 132. The top 136 extends inwardly, towards the longitudinal axis B of the housing 30, from a top edge 138 of the peripheral wall 134. The top 136 delimits an opening 141 having transverse dimensions smaller than the cross-section of the recess 130 defined by the peripheral wall 134, and greater than the transverse dimensions of the shank 15 and the converging portion 18 of the lower plug 13. A lower surface of the top 136 forms an abutting surface 143. The bottom 132 is e.g. substantially disk-shaped. The peripheral wall 134 has e.g. a cylindrical shape of substantially circular cross-section.

The clamp 33 is received in the respective housing 30. It is embedded in the housing 30. The clamp 33 is substantially symmetrical with respect to the longitudinal axis B of the housing 30. It comprises a substantially flat base 145, extended upwardly by at least two legs 147, the legs being arranged at symmetrical positions with respect to the longitudinal axis A of the clamp 33. In the illustrated embodiment, the clamp 33 comprises two legs 147 and is substantially U-shaped.

In this embodiment, the retainers comprise a constriction 150, provided at the top end of the clamp 33 and adapted to longitudinally retain the respective PLFR 11. The constriction 150 is formed by a substantially V-shaped fold 155, provided in a diametrically opposed location on each of the legs 147 of the clamp 33.

The constriction 150 is adapted to engage the shoulder 20 provided on the lower plug 13, when the PLFR 11 is in its pulled away position, in order to prevent the PLFR 11 from moving further upwards, and thus to prevent a disengagement of the PLFR 11 from the base 2.

Free ends 157 of the clamp 33 are adapted to abut against the abutting surface 143. The free ends 157 extend upwardly towards the top 136 and outwardly towards the peripheral wall 134 of the housing 30 from the constriction 150. The first assembly, adapted to retain the clamp 33 against an upward displacement with respect to the base 2 thus comprises the free ends 157 of the clamp 33 and the abutting surface 143 provided on the housing 30.

The base 145 of the clamp 33 is supported on the bottom 132 of the housing 30. The base 145 and the bottom 132 thus form the second assembly, adapted to retain the clamp 33 against a downward displacement with respect to the housing 30.

The PLFR 11 is mobile along the longitudinal direction between a seated position and a pulled away position. In the seated position of the PLFR 11, the retainer, provided on the clamp 33, in particular the constriction 150, is spaced longitudinally from the shoulder 20 provided on the PLFR 11. In the pulled-away position, the PLFR 11 has moved upwards along the longitudinal axis with respect to the seated position and the retainer engages the shoulder 20.

During normal operation of the nuclear reactor, the PLFR 11 is in the pulled away position, under the effect of the flow of coolant.

The clamp 33 is for example a spring made one-piece, in particular a sheet spring. The elastic retaining force of the clamp 33 is chosen so as to allow the intentional insertion or extraction of the lower plug 13 of the PLFR 11 into or from the housing 30, and to prevent a disengagement of the PLFR 11 from the clamp 33 merely under the effect of the upward force exerted by the shoulder 20 on the constriction 150.

In the disclosed third embodiment, the housing 30 has a substantially circular shape. However, other shapes may be contemplated. In this embodiment, the housing 30 has a closed bottom 132. However, alternately, the housing 30 may be a through hole, an opening being provided in the bottom 132.

The nuclear fuel assembly 1 according to the third embodiment of the invention reduces the risk of lift-off of the PLFRs during operation of the nuclear reactor, since the lower plugs 13 of at least some of the PLFRs 11 are longitudinally retained on the base 2 due to the cooperation between the constriction 150 of the clamp 33 and the shoulder 20 provided on the lower plug 13.

This nuclear fuel assembly 1 also induces lower costs, since the clamp 33 can be easily assembled and secured to the base, simply by insertion into the housing 30. Moreover, the clamp 33 has a particular simple structure and is easy to manufacture.

In one embodiment (not illustrated), the clamp 33 according to the second embodiment may be used in combination with the housing 30 according to the third embodiment of the invention. In this embodiment, the retaining tabs 94 and the assembly tabs 78 may have the same length.

Figure 7:
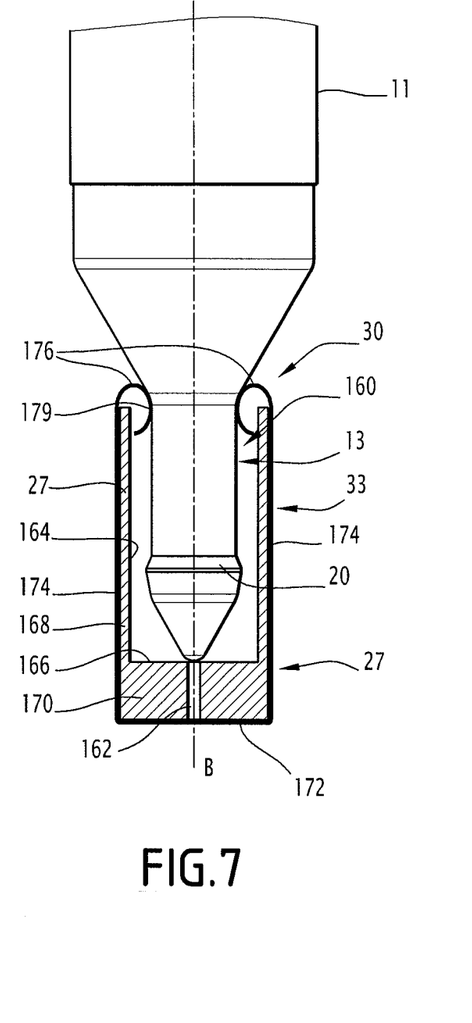

In the fourth embodiment shown on FIG. 7, each housing 30 comprises a stepped through-hole 160 having a longitudinal axis B, provided in the respective bar 27. The housing 30 delimits a first housing section 162, extended upwardly by a second housing section 164. The second housing section 164 has a bottom 166, e.g. of substantially annular shape, extended upwardly by a peripheral wall 168, e.g. of substantially cylindrical shape having a circular cross-section. The first housing section 162 has a peripheral wall 170, e.g. of substantially cylindrical shape having a circular cross-section. The first housing section 162 is open upwardly and downwardly. The transverse dimensions, e.g. the diameter of the first housing section 162 are smaller than the transverse dimensions, e.g. the diameter of the second housing section 164. In particular, the diameter of the first housing section 162 is approximately equal to the diameter of the tip of the converging portion 18 of the PLFR 11.

In this embodiment, the first housing section 162 provides a passage for the coolant to flow through the bar 27 along the lower plug 13 of the PLFR 11.

In the nuclear fuel assembly 1 according to this embodiment, the clamp 33 is symmetrical with respect to the longitudinal axis B of the housing 30. The clamp 33 is substantially U-shaped. It comprises a central portion, comprising a flat base 172, extended upwardly by two legs 174, and free ends 176. The central portion of the clamp 33 is fitted around the bar 27. The free ends 176 are bent inwards and form a constriction 179 in the housing 30. The free ends 176 are received in the housing 30. The constriction 179 is adapted to engage the annular shoulder 20 of the PLFR 11 in order to retain the PLFR 11 longitudinally on the base 2. In this embodiment, the first assembly comprises complementary portions of the bar 27 and the central portion of the clamp 33, these complementary portions providing a form fit between the bar 27 and the clamp 33, and the second assembly comprises the bend of the free ends 176 into the housing 30.

The clamp 33 is for example a spring made one-piece, in particular a sheet spring. The elastic retaining force of the clamp 33 is chosen so as to allow the intentional insertion or extraction of the lower plug 13 of the PLFR 11 into or from the housing 30, and to prevent a disengagement of the PLFR 11 from the clamp 33 merely under the effect of the upward force exerted by the shoulder 20 on the constriction 179.

In the disclosed fourth embodiment, the housing 30 has a substantially circular shape. However, other shapes may be contemplated.

The nuclear fuel assembly 1 according to the fourth embodiment of the invention reduces the risk of lift-off of the PLFRs 11 during operation of the nuclear reactor, since the lower plugs 13 of at least some of the PLFRs 11 are longitudinally retained on the base due to the cooperation between the constriction 179 of the clamp 33 and the shoulder 20 provided on the lower plug 13.

This nuclear fuel assembly 1 also induces lower costs, since the clamp 33 can be easily assembled and secured to the base 2, simply by fitting around the bar 27 and by engagement of the free ends into the housing 30.

Moreover, the clamp 33 has a particular simple structure and is easy to manufacture.

In all the described embodiments, the clamp 33 is preferably made of material with high yield strength such as Ni-based super-alloy such as Inconel®, or Fe-based super alloy or Ti alloy or even precipitation-hardened stainless-steel such as defined by AMS (Aerospace Material Specification) 5629 and 5643. Moreover, in all the described embodiments, the clamp 33 may be made one-piece.

The nuclear fuel assembly 1 according to first, second, third and fourth embodiments allows the flow of coolant through the housing 30 and along the lower ends of the PLFRs 11. This flow of coolant cools the lower ends of the PLFRs 11, but it also rinses the housing 30 in particular in order to avoid CRUD (Chalk River Unidentified Deposits), which are likely to accumulate about the lower ends of the PLFRs in a boiling water reactor (BWR). As shown in the third embodiment, this feature is not necessarily present.

In all the disclosed embodiments, the relationship between the base 2 and the PLFRs 11 can be implemented through other parts of the base 2 than the debris filter.

Also, only some of the PLFRs 11 may be retained by clamps 33, other PLFRs 11 being retained by other known retainers.

The invention claimed is:

1. A nuclear fuel assembly for a boiling water reactor comprising:
   a base,
   a head, and
   a bundle of full length fuel rods and partial length fuel rods, the bundle extending upwardly and longitudinally from the base to the head,
   at least one clamp for longitudinally retaining a lower plug of a partial length fuel rod with respect to the base, the clamp being an additional part fitted to the base, the clamp being assembled to the base by mechanical engagement of complementary assemblies, the clamp being embedded in a housing provided in the base such that the clamp is entirely below an upper surface of the base and entirely above a lower surface of the base, the housing consisting of a hole formed in the base, the clamp being comprised in the hole, wherein the clamp comprises elastic retaining tabs, spaced angularly about a longitudinal axis of the clamp and adapted to engage with a shoulder provided on the lower plug of the partial length fuel rod to prevent a disengagement of the partial length fuel rod from the base.

2. The nuclear fuel assembly as recited in claim 1 wherein the complementary assemblies comprise a first assembly and a second assembly, the first assembly being adapted to retain the clamp against an upward displacement of the clamp with respect to the base and the second assembly being adapted to retain the clamp against a downward displacement with respect to the base.

3. The nuclear fuel assembly as recited in claim 2 wherein the housing is a through-hole extending from an upper surface of the base to a lower surface of the base.

4. The nuclear fuel assembly as recited in claim 3 wherein the clamp allows the flow of coolant through the housing and along the lower end of the partial length fuel rod.

5. The nuclear fuel assembly as recited in claim 3 wherein the clamp comprises a support adapted to contact a portion of the lower plug of the partial length fuel rod in order to hold the lower plug of the partial length fuel rod at a distance from the lower surface of the base.

6. The nuclear fuel assembly as recited in claim 5 wherein the support comprises support tabs, spaced angularly about a longitudinal axis of the clamp, each support tab comprising a free end extending inwards in the direction of the longitudinal axis of the clamp, the free ends of the support tabs delimiting an opening for receiving the portion of the lower plug of the partial length fuel rod.

7. The nuclear fuel assembly as recited in claim 6 wherein the second assembly comprises a lower support surface provided in the housing, the support tabs being supported longitudinally on the lower support surface.

8. The nuclear fuel assembly as recited in claim 6 wherein the first assembly comprises an abutting surface provided in the housing, and elastic assembly tabs provided on the clamp and comprising free ends extending upwards, the abutting surface being adapted to engage with the free ends of the elastic assembly tabs,
wherein the clamp comprises elastic retaining tabs, spaced angularly about a longitudinal axis of the clamp and adapted to engage with a shoulder provided on the lower plug of the partial length fuel rod to prevent a disengagement of the partial length fuel rod from the base,
wherein the clamp comprises a body and wherein the support tabs extend inwards from a lower edge of the body, and the retaining tabs and assembly tabs extend upwards from an upper edge of the body.

9. The nuclear fuel assembly as recited in claim 8 wherein in a seated position, in which the support prevents the partial length fuel rod from moving further downwards, the clamp only contacts the lower plug of the partial length fuel rods by the support tabs and of the retaining tabs, a radial clearance existing between an inner surface of the clamp and the peripheral surface of the lower plug of the partial length fuel rod in the portion of the partial length fuel rod extending between the support tabs and the retaining tabs.

10. The nuclear fuel assembly as recited in claim 2 wherein the first assembly comprises an abutting surface provided in the housing, and elastic assembly tabs provided on the clamp and comprising free ends extending upwards, the abutting surface being adapted to engage with the free ends of the elastic assembly tabs.

11. The nuclear fuel assembly as recited in claim 1 wherein the complementary assemblies comprise a central flat base of the clamp, supported on a bottom of the housing and an abutting surface provided in the housing, the abutting surface being adapted to engage with upper free ends of the clamp.

12. The nuclear fuel assembly as recited in claim 11 wherein the clamp comprises a constriction, which is resiliently biased to engage with the lower plug of the partial length fuel rod and is adapted to cooperate with a shoulder provided on the lower plug of the partial length fuel rod.

13. The nuclear fuel assembly as recited in claim 1 wherein the housing is a through-hole extending from an upper surface of the base to a lower surface of the base.

14. The nuclear fuel assembly as recited in claim 13 wherein the clamp allows the flow of coolant through the housing and along the lower end of the partial length fuel rod.

15. A nuclear fuel assembly for a boiling water reactor comprising:
a base,
a head, and
a bundle of full length fuel rods and partial length fuel rods, the bundle extending upwardly and longitudinally from the base to the head,
at least one clamp for longitudinally retaining a lower plug of a partial length fuel rod with respect to the base, the clamp being an additional part fitted to the base, the clamp being assembled to the base by mechanical engagement of complementary assemblies, the clamp being embedded in a housing provided in the base such that the clamp is entirely below an upper surface of the base and entirely above a lower surface of the base, the housing consisting of a hole formed in the base, the clamp being comprised in the hole,
wherein the complementary assemblies comprise a first assembly and a second assembly, the first assembly being adapted to retain the clamp against an upward displacement of the clamp with respect to the base and the second assembly being adapted to retain the clamp against a downward displacement with respect to the base,
wherein the housing is a through-hole extending from an upper surface of the base to a lower surface of the base,
wherein the clamp comprises a support adapted to contact a portion of the lower plug of the partial length fuel rod in order to hold the lower plug of the partial length fuel rod at a distance from the lower surface of the base,
wherein the support comprises support tabs, spaced angularly about a longitudinal axis of the clamp, each support tab comprising a free end extending inwards in the direction of the longitudinal axis of the clamp, the free ends of the support tabs delimiting an opening for receiving the portion of the lower plug of the partial length fuel rod,
wherein the first assembly comprises an abutting surface provided in the housing, and elastic assembly tabs provided on the clamp and comprising free ends extending upwards, the abutting surface being adapted to engage with the free ends of the elastic assembly tabs,
wherein the clamp comprises elastic retaining tabs, spaced angularly about a longitudinal axis of the clamp and adapted to engage with a shoulder provided on the lower plug of the partial length fuel rod to prevent a disengagement of the partial length fuel rod from the base,
wherein the clamp comprises a body and wherein the support tabs extend inwards from a lower edge of the body, and the retaining tabs and assembly tabs extend upwards from an upper edge of the body.

16. The nuclear fuel assembly as recited in claim 15 wherein in a seated position, in which the support prevents the partial length fuel rod from moving further downwards, the clamp only contacts the lower plug of the partial length fuel rods by the support tabs and of the retaining tabs, a radial clearance existing between an inner surface of the clamp and the peripheral surface of the lower plug of the partial length fuel rod in the portion of the partial length fuel rod extending between the support tabs and the retaining tabs.

17. The nuclear fuel assembly as recited in claim 15 wherein the clamp allows the flow of coolant through the housing and along the lower end of the partial length fuel rod.

18. The nuclear fuel assembly as recited in claim 15 wherein the second assembly comprises a lower support surface provided in the housing, the support tabs being supported longitudinally on the lower support surface.

\* \* \* \* \*